(12) United States Patent
Hawkins

(10) Patent No.: US 10,052,826 B2
(45) Date of Patent: Aug. 21, 2018

(54) BULK RESIN INFUSION

(75) Inventor: Robert Dennis Hawkins, Bonney Lake, WA (US)

(73) Assignee: The Boeing Company, Chicago, IL (US)

( * ) Notice: Subject to any disclaimer, the term of this patent is extended or adjusted under 35 U.S.C. 154(b) by 1605 days.

(21) Appl. No.: 13/279,308

(22) Filed: Oct. 23, 2011

(65) Prior Publication Data

US 2012/0043704 A1  Feb. 23, 2012

Related U.S. Application Data

(63) Continuation-in-part of application No. 11/257,144, filed on Oct. 25, 2005, now Pat. No. 8,066,503.

(51) Int. Cl.
| | |
|---|---|
| B29C 45/14 | (2006.01) |
| B29C 70/34 | (2006.01) |
| B29C 70/44 | (2006.01) |
| B29C 70/46 | (2006.01) |
| B29L 31/00 | (2006.01) |

(52) U.S. Cl.
CPC .......... *B29C 70/342* (2013.01); *B29C 70/443* (2013.01); *B29C 70/465* (2013.01); *B29L 2031/779* (2013.01)

(58) Field of Classification Search
CPC ....... B29C 70/00; B29C 70/44; B29C 70/443; B29C 45/14631; B29C 45/0005; B29C 51/00; B29C 51/12; B29C 70/342; B29C 70/465
See application file for complete search history.

(56) References Cited

U.S. PATENT DOCUMENTS

| | | | | |
|---|---|---|---|---|
| 4,942,013 A | * | 7/1990 | Palmer et al. | 264/511 |
| 5,116,216 A | * | 5/1992 | Cochran et al. | 425/504 |
| 5,665,301 A | * | 9/1997 | Alanko | 264/571 |
| 6,818,159 B2 | * | 11/2004 | Hinz | 264/40.6 |
| 2002/0185785 A1 | * | 12/2002 | Thrash et al. | 264/571 |
| 2004/0070114 A1 | * | 4/2004 | Filleul | 264/257 |
| 2005/0079241 A1 | * | 4/2005 | Moore et al. | 425/388 |

FOREIGN PATENT DOCUMENTS

| | | | | |
|---|---|---|---|---|
| DE | 19630840 C1 | * | 2/1998 | B29C 70/42 |
| WO | WO 03101708 A1 | * | 12/2003 | B29C 70/44 |

* cited by examiner

*Primary Examiner* — Yogendra N Gupta
*Assistant Examiner* — Ninh Le
(74) *Attorney, Agent, or Firm* — Miller, Matthias & Hull LLP

(57) ABSTRACT

A method for performing resin infusion into a dry reinforcement on a layup mandrel comprises placing resin at a resin zone on the mandrel; bagging the reinforcement and the resin with a bagging film; heating the resin while applying compaction pressure to the bagging film to cause the resin to be infused into the reinforcement; and creating a pressure differential outside of the bagging film over the resin zone to control rate and pressure at which the resin is infused into the reinforcement. As a result, the resin pressure and infusion rate are controlled independently of the compaction pressure on the reinforcement.

20 Claims, 6 Drawing Sheets

BULK RESIN INFUSION

This is a continuation-in-part of U.S. Ser. No. 11/257,144 filed 25Oct. 2005, now U.S. Pat. No. 8,066,503.

BACKGROUND

Composites are attractive to the aerospace industry because of their high strength and rigidity and low weight. Composite structures such as skin and stiffeners may be constructed by laying up plies of reinforcing fibers on a mandrel, forming an air-tight envelope such as a bagging film over the reinforcement, infusing resin into the "bagged" reinforcement, and curing the resin-infused reinforcement.

A first type of resin infusion system includes a liquid resin in a resin inlet tank. Resin infusion is performed by conveying the liquid resin and injecting the liquid resin through the envelope. Once underneath the envelope, the liquid resin is distributed to the reinforcement via distribution media (typically more than one ply of a permeable fabric). The rate of resin infusion may be controlled by varying permeability of the distribution media, partially restricting the flow of resin by pinching or otherwise restricting an inlet line, or controlling atmospheric pressure in a sealed resin inlet tank.

A second type of system performs resin infusion by starting with solid or putty-like resin underneath the envelope. During resin infusion, a pressure differential is applied across the envelope, resulting in compaction pressure on the reinforcement and the resin. This compaction pressure causes resin to flow into the reinforcement.

This second type of system offers several advantages over the system that injects liquid resin. It can infuse resin at a relatively higher flow rate. Moreover, the second type of system eliminates tubing systems that convey the liquid resin from the inlet tank, thereby reducing complexity of the resin infusion and also eliminating a source of vacuum leaks. The second type of system also enables the use of relatively higher viscosity resins.

The second type of system suffers from not being able to control the pressure and rate of resin infusion independently of compaction pressure on the reinforcement. It would be desirable to overcome this drawback.

SUMMARY

According to an embodiment herein, a method for performing resin infusion into a dry reinforcement on a layup mandrel comprises placing resin at a resin zone on the mandrel; bagging the reinforcement and the resin with a bagging film; heating the resin while applying compaction pressure to the bagging film to cause the resin to be infused into the reinforcement; and creating a pressure differential outside of the bagging film over the resin zone to control rate and pressure at which the resin is infused into the reinforcement. As a result, the resin pressure and infusion rate are controlled independently of the compaction pressure on the reinforcement.

According to another embodiment herein, a method comprises performing bulk resin infusion of resin into a reinforcement, wherein a pressure differential between pressure outside an envelope over a resin starting location and pressure within the envelope is modulated to control resin pressure and infusion rate independently of compaction pressure on the reinforcement.

DETAILED DESCRIPTION

Bulk resin infusion ("BRI") utilizes a form or mandrel for retaining a layup. The layup includes at least one ply of reinforcement, parting film, and infusion media. Resin may be disposed in contact with the infusion media, which is adjacent to the reinforcement. A gas tight or substantially gas impermeable envelope may envelope the layup and the resin. In response to a pressure differential across the envelope, compaction pressure is exerted upon the layup and the resin. The compaction pressure causes the resin to flow through the infusion media and infuse into the reinforcement.

In embodiments herein, pressure and rate at which resin is infused into the reinforcement is controlled independently of the compaction pressure exerted on the reinforcement. Such control includes modulating the ambient pressure around a portion of the envelope that covers the resin relative to the ambient pressure around a portion of the envelope that covers the reinforcement.

BRI enables the use of relatively higher viscosity resins. Certain high viscosity resins exhibit material properties that may be advantageous in relatively high technology applications such as, for example, aerospace, racing, and sports equipment. Resin formulations suitable for BRI may include thermoset resins that are solid or putty-like at room temperature.

To decrease viscosity sufficiently to facilitate infusion, the resin may be heated. At this heating phase and/or in response to a decrease in pressure, entrapped bubbles and/or volatile solutions may "outgas" from the resin. If this out gassing were to occur within the reinforcement, voids or other such imperfections might result. In embodiments herein, to prevent the outgassing from occurring within the reinforcement, a lower ambient pressure (higher vacuum) is temporarily applied to the outer area of the envelope covering the resin, compared to ambient pressure under the envelope. The lower ambient pressure holds the envelope above the resin, creating a volume through which gasses may escape prior to infusion.

Figure 1:
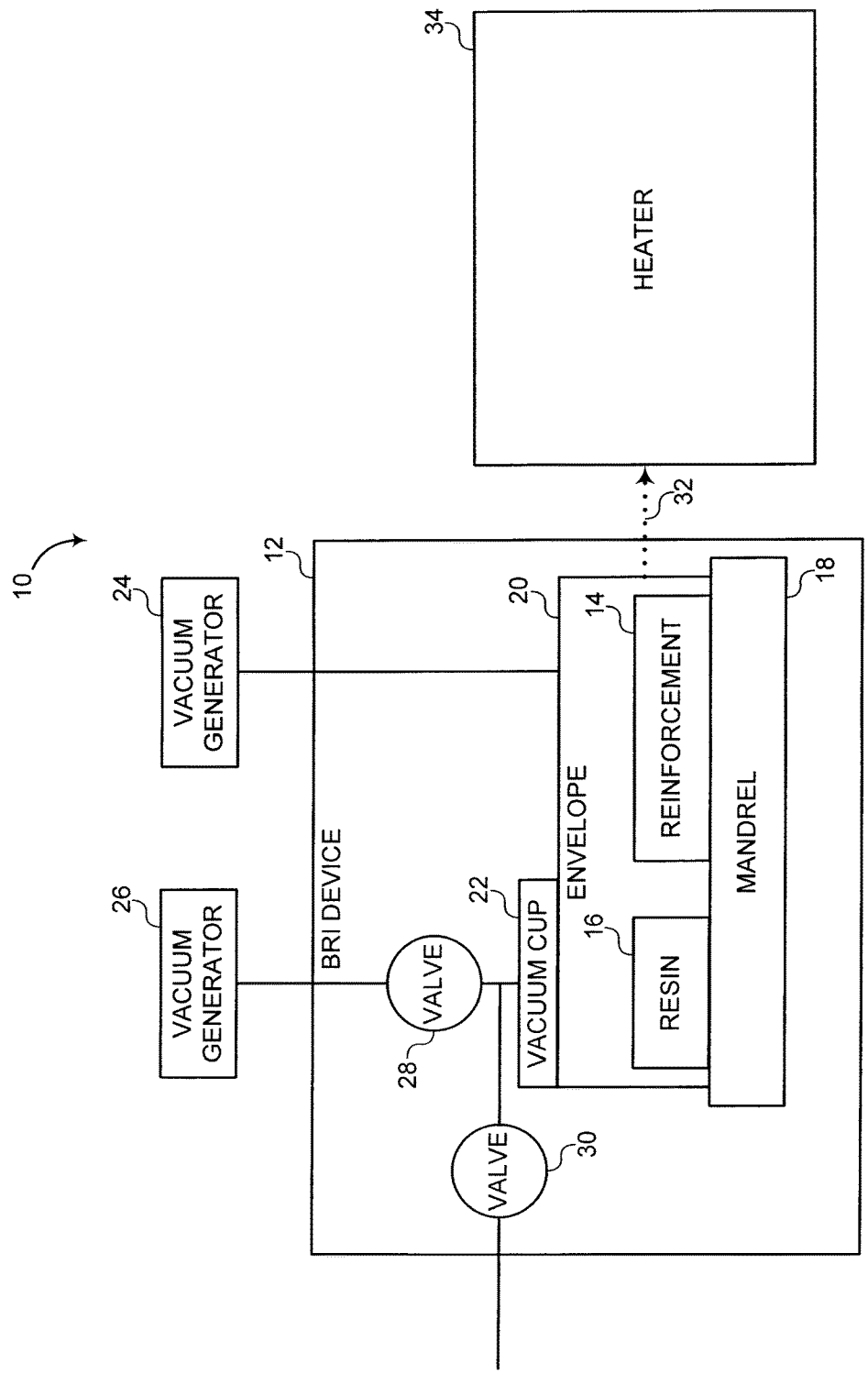
FIG. 1 is an illustration of a bulk resin infusion system.

Reference is made to FIG. 1, which illustrates an embodiment of a vacuum assisted bulk resin infusion (BRI) system 10. The system 10 includes a BRI device 12 to infuse a reinforcement 14 with a resin 16. The BRI device 12 includes a mandrel 18, envelope 20, and vacuum cup 22. The mandrel 18 provides a surface (the resin zone) upon which the resin 16 is placed. In some embodiments, the resin 16 may be solid or putty-like. In other embodiments, liquid resin may be placed at the resin zone. For instance, the liquid resin may be placed in a depression in the mandrel, or a dike may be built around the liquid resin (e.g., using tacky tape covered with Teflon tape).

The mandrel 18 also includes a surface (the reinforcement zone) upon which the reinforcement 14 is placed and provides a mold to which the reinforcement 14 may conform. The resin 16 and the reinforcement 14 are compressed upon the mandrel 18 in response to a pressure differential across the envelope 20. This pressure differential is such that an interior of the envelope 20 is at a relatively lower pressure than an exterior of the envelope 20. For example, a vacuum generator 24 in fluid connection with the envelope 20 may be configured to remove a portion of air and/or gasses from inside the envelope 20. In this manner ambient air pressure may exert a force upon the envelope 20. Placing the system 10 inside a pressure vessel or autoclave allows greater pressure to be applied to the outside of the envelope 20.

The vacuum cup 22 facilitates controlling the amount of compressive force the envelope 20 exerts on the resin 16. In general, the vacuum cup 22 is disposed in cooperative alignment with the resin 16. For example, the vacuum cup 22 is disposed upon the envelope 20 at a portion of the envelope 20 that is above the resin 16. The vacuum cup 22 is in fluid communication with a vacuum generator 26 that may be controlled to remove a portion of the atmosphere from the outside of the envelope 20 above the resin 16.

The BRI device 12 optionally includes one or more valve such as valves 28 and 30. If present, the valves 28 and 30 are configured to control the amount of vacuum pressure within the vacuum cup 22. For example, by closing the valve 30 and opening the valve 28, the pressure within the vacuum cup 22 may be reduced by the vacuum generator 26. In another example, by closing the valve 28 and opening the valve 30, air or an inert gas (e.g., nitrogen surrounding the system 10) at ambient pressure may be allowed to enter the vacuum cup 22. If the pressure in the vacuum cup 22 is less than the ambient pressure, the pressure within the vacuum cup 22 may be raised by the ingress of air or inert gas.

The BRI device 12 may be heated 32 by a heat source 34. The heat source 34 is configured to raise the temperature of the resin 16 or otherwise impart thermal energy into the resin 16. The heat source 34 may include, for example, a heating element, infra red (IR) heater, oven, or autoclave. In a particular example, the heat source 34 includes an oven having an interior volume sufficiently large to contain the BRI device 12. In another example, the heat source 34 includes an autoclave having a pressure chamber with sufficient volume to contain the BRI device 12 and operable to increase the temperature and/or ambient pressure within the pressure chamber. In response to being heated to a predetermined temperature and/or for a predetermined time, viscosity of the resin 16 is, initially, reduced such that the resin 16 is operable to flow into or infuse the reinforcement 14. In response to further elevating the temperature and/or an extended curing period, the viscosity of the resin 16 is increased and the resin 16 solidifies due to an essentially irreversible chemical polymerization reaction. Following heating, the BRI device 12 may be removed from the heat source 34 or otherwise allowed to cool.

Figure 2:
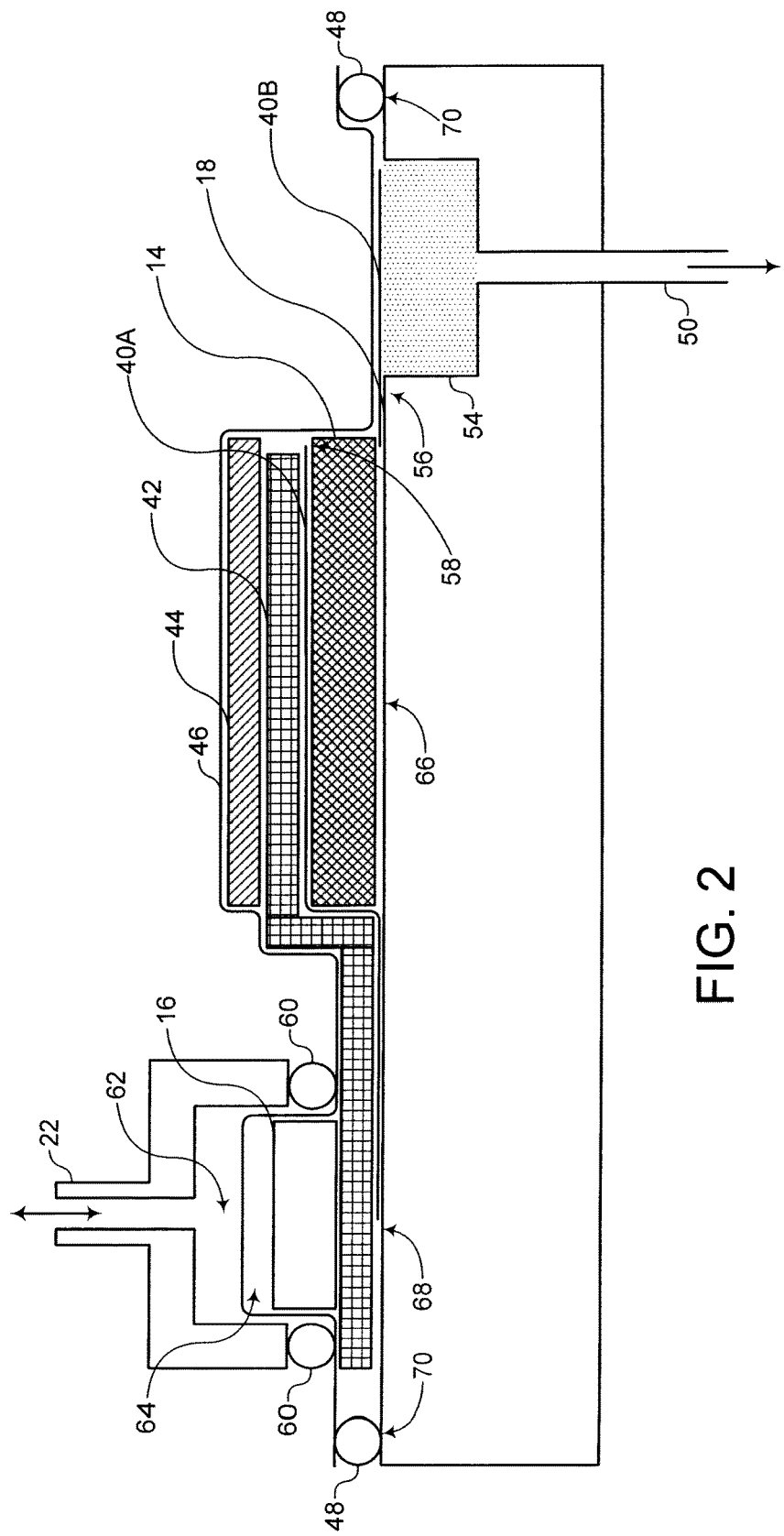
FIG. 2 is an illustration of a bulk resin infusion device suitable for use with the bulk resin infusion system of FIG. 1.

Additional reference is made to FIG. 2, which illustrates an example of the BRI device 12. A layup includes the reinforcement 14, parting films 40A and 40B, infusion media 42, and optional caul plate 44. The BRI device 12 includes bagging film 46, sealant 48, vacuum ports 50, and exit breather 54. The vacuum ports 50 or "probes" are generally placed above the mandrel surface, on top of the exit breather 54, and penetrate through the bagging film 46.

The parting films 40A and 40B include any suitable release film or peel ply operable to reduce adhesion of the cured reinforcement to the various other components of the BRI device 12. Generally, suitable parting films include those that do not appreciably adhere to the resin 16. Suitable parting films may facilitate a flow of liquidus resin across the parting film.

The infusion media 42 facilitates flow of the resin 16 into the reinforcement 14 from a position relatively to one side of the reinforcement. In general, the infusion media 42 is permeable and retains its permeability under the conditions of temperature and pressure that occur during infusion. Examples of the infusion media 42 include, but are not limited to, multiple layers of fabric having a lot of spaces through which resin can flow.

The caul plate 44 may be used to modify surface characteristics of the cured reinforcement (e.g., create an aerosmooth surface). The caul plate 44 may include a relatively stiff or rigid material having a lower surface that is drawn toward an upper surface of the reinforcement 14. In this manner, the upper surface of the reinforcement may be modified to essentially correspond to the lower surface of the caul plate 44.

The bagging film 46 is sealed upon the mandrel 18 to form an envelope 20 that encloses the reinforcement 14 and the resin 16 and, to a sufficiently large extent, prevents air and/or gasses from passing therethrough. Generally, the bagging film 46 includes any suitably impermeable membrane, layer, or barrier. Suitable materials from which the bagging film may be made include plastics, rubbers, resins, and the like.

The sealant 48 facilitates generating a gas tight or substantially gas impermeable seal between the bagging film 46 and the mandrel 18. Examples of suitable sealing materials and/or methods includes sticky, tacky and other such adhesive tapes or cordage, heat sealing, elastomeric seals, and the like. In other embodiments, the sealant 48 is optional and may be omitted. For example, the vacuum film 46 may include a bag, reusable bag, or other such envelope in which the BRI device 12 of FIG. 1 is placed.

The vacuum port 50 facilitates removal of some or all of the atmosphere inside the envelope 20. For example, the vacuum port 50 may be fluidly attached to the vacuum generator 24 to draw out air and/or other gasses from inside the envelope 20. Additional vacuum ports may be used and may also be connected to instruments to monitor the vacuum level.

The exit breather 54 facilitates removal of the atmosphere from the BRI device 12 by increasing the surface area from which gasses are removed via the vacuum port 50. In a particular example, the exit breather 54 includes a porous fabric, woven fiberglass tape, metal or ceramic material.

The BRI device 12 further includes a sealant 60 that may be similar to the sealant 48. The sealant 60 forms a seal between the vacuum cup 22 and the bagging film 46. More particularly, the sealant 60 may disposed about a perimeter of the resin 16 to seal the vacuum cup 22 over the resin 16.

As show in FIG. 2, the vacuum cup 22 includes a chamber 62. By modulating a pressure within the chamber 62 ($P_{chamber}$) relative to a pressure within the envelope 20 ($P_{envelope}$), a force ($F_{bf}$) exerted by the bagging film 46 upon the resin 16 may be controlled. For example, by modulating the $P_{chamber}$ to essentially coincide with the $P_{envelope}$, the force $F_{bf}$ may be substantially zero. By modulating $P_{chamber}$ to a greater pressure (typically a lower vacuum level) than $P_{envelope}$, the liquid resin may be infused into the reinforcement 14 while still maintaining a positive compaction pressure on the reinforcement 14 via the bagging film 46. In another example, by maintaining a negative pressure differential or negative differential pressure of the $P_{chamber}$ relative to the $P_{envelope}$, the bagging film 46 may be drawn away from the resin 16 to generate an out gassing pocket 64. In this regard, the $P_{envelope}$ is essentially equal to a pressure $P_{pocket}$ within the out gassing pocket 64. If necessary, degassing may be performed during the early heating phase of an infusion. When degassing is finished, full vacuum may be applied to $P_{envelope}$ and $P_{chamber}$ is increased to start the infusion.

The out gassing pocket 64 provides a volume for any out gassed products and/or provides some "head space" for bubbles that rise to the surface of the resin during out gassing to break in. The infusion media 42 may be placed above the resin 16 to facilitate the removal of gasses without beginning the infusion.

The reinforcement 14 is located at the reinforcement zone 66, which is provided by a surface of the mandrel 18. The surface may be configured to facilitate removal of the cured reinforcement 14. For example, a release coating may be applied to the reinforcement zone 66. In another example, the reinforcement zone 66 may be polished or otherwise surfaced.

The mandrel 18 also provides a surface for the resin zone 68. As shown in FIG. 2, the resin zone 68 abuts, or nearly abuts the reinforcement zone 66 and is fluidly connected to the reinforcement zone 66 via the infusion media 42.

To prepare for resin infusion, the various components may be positioned in a manner similar to that illustrated in FIG. 2. The gas tight envelope 20 surrounds the reinforcement 14 and the infusion media 42. Gasses are drawn from the envelope 20 via the exit breather 54 and a depressurized volume is formed within the envelope 20. Any ambient pressure present outside of the envelope 20 acts to press the bagging film 46 upon the components within the envelope 20. Resilience of the reinforcement 14 and the infusion media 42 tend to resist this compaction pressure.

Upon sufficient reduction in the viscosity of the resin 16 and upon application of an appropriate pressure differential, the resin 16 is drawn or forced into the infusion media 42, through the parting film 40A and into the reinforcement 14. By modulating $P_{chamber}$ relative to $P_{envelope}$, a compaction force ($F_{bf}$) exerted by the bagging film 46 upon the resin 16 is controlled independently of the compaction pressure of the bagging film 46 on the reinforcement 14.

Figure 3:
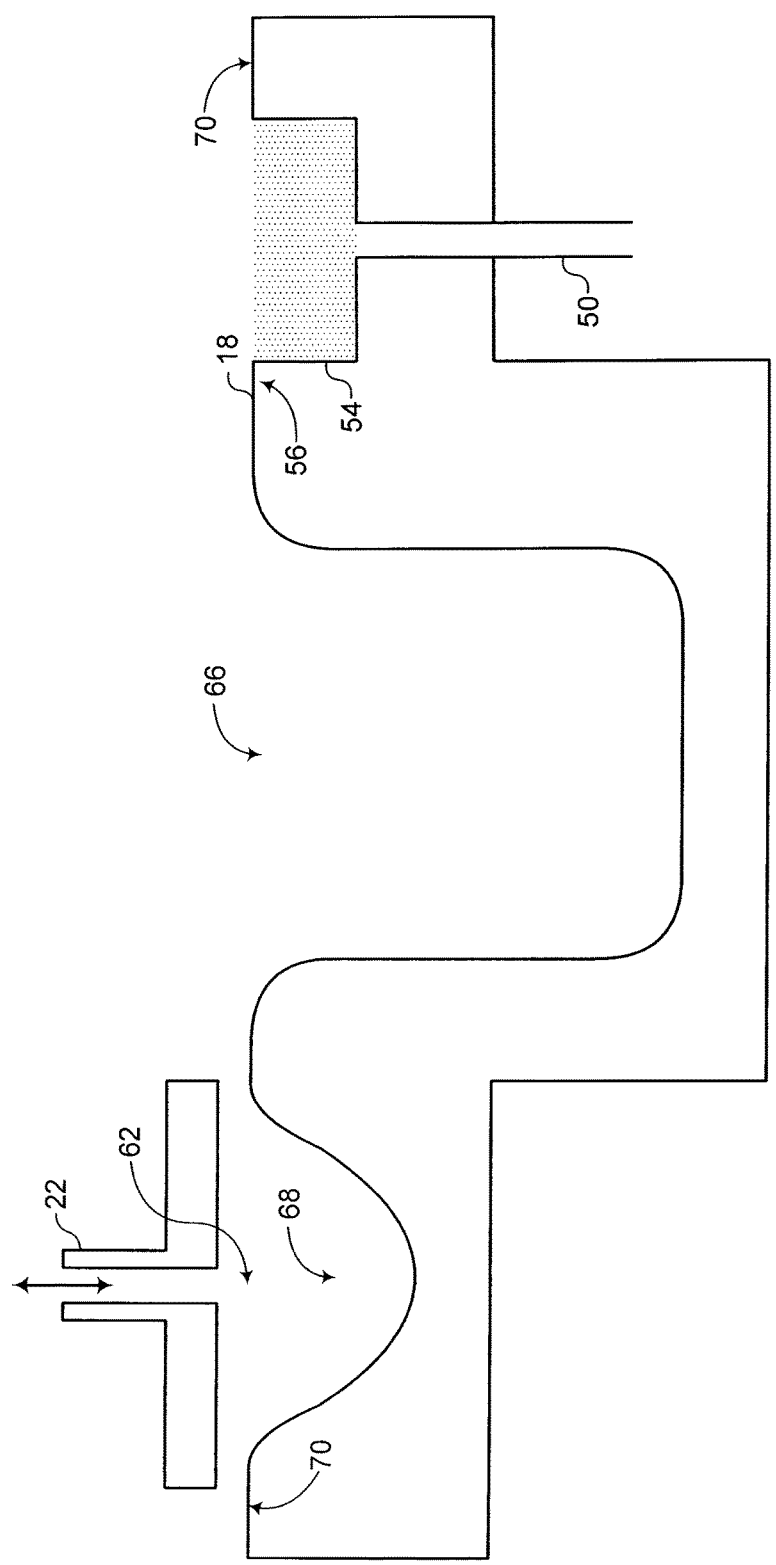
FIGS. 3 and 4 are illustrations of mandrels suitable for use with the bulk resin infusion system of FIG. 1.

Reference is now made to FIG. 3, which shows another example of a mandrel 18. The mandrel 18 of FIG. 3 may be similar to the mandrel 18 of FIG. 2, except as follows. In the mandrel 18 of FIG. 3, the reinforcement 14 forms a "C" channel profile and the reinforcement zone 66 includes a female mold that corresponds to the "C" channel profile. In addition, the resin zone 68 has a concavity or depression for retaining the resin 16 prior to and during resin infusion. Moreover, the infusion media 42 may be placed above the resin 16. Resin infusion begins when the bagging film 46 pushes the infusion media 42 down into the resin 16. The vacuum cup 22 for a concave resin zone 68 may have an essentially flat underside or it may have a scalloped underside in the area over the infusion media 42 (FIG. 3 shows an underside that is essentially flat).

The concave resin zone 68 is advantageous in that it allows the melted resin 16 to remain in the resin zone 68 while gasses flow out through the infusion media 42, so long as relatively lower pressure is maintained within the chamber 62 relative to the envelope 20. The exit of gasses through the infusion media 42 is enhanced by the infusion media 42 being placed above the resin 16.

Figure 6:
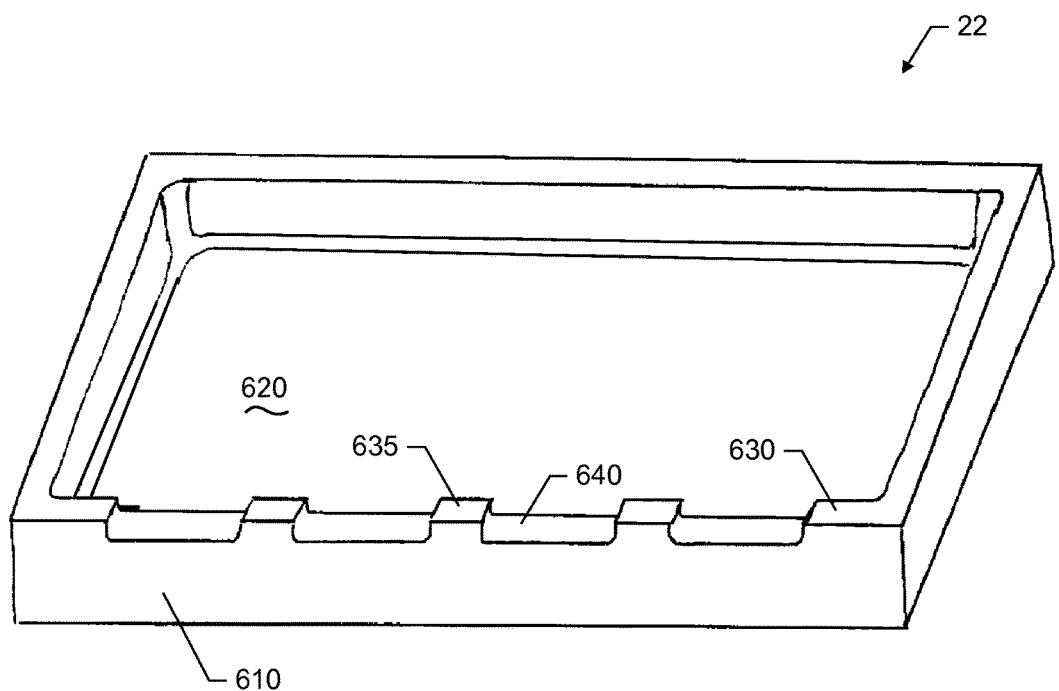
FIG. 6 is an illustration of a vacuum cup suitable for use with the bulk resin infusion system of FIG. 1.

Reference is made to FIG. 6, which illustrates an underside of a vacuum cup 22 including walls 610 that define a chamber 620. (Plumbing connections to the chamber 620 are not illustrated). A surface 630 of the walls 610 conforms to the contour (if any) of the perimeter of the resin zone 68. The surface 630 includes undercut, scalloped or slightly hollowed areas 640 on or near an edge of the wall proximal to the reinforcement 14. Edges defining the scalloped areas 640 may be rounded somewhat to protect the bagging film 46 from stretching too much in one area or from tearing. The depth of the scalloped areas 640 may be a little greater than the thickness of the infusion media 42. If the depth is too great, vacuum leaks could develop between the bagging film 46 and the vacuum cup 22. The force of the perimeter of the vacuum cup 22 upon the infusion media 42 is concentrated into localized areas 635 and any collapsing of the infusion media 42 will also occur in those same localized areas 635, with unrestricted flow of the resin 16 in the scalloped areas 640 between the collapsed areas.

Figure 4:
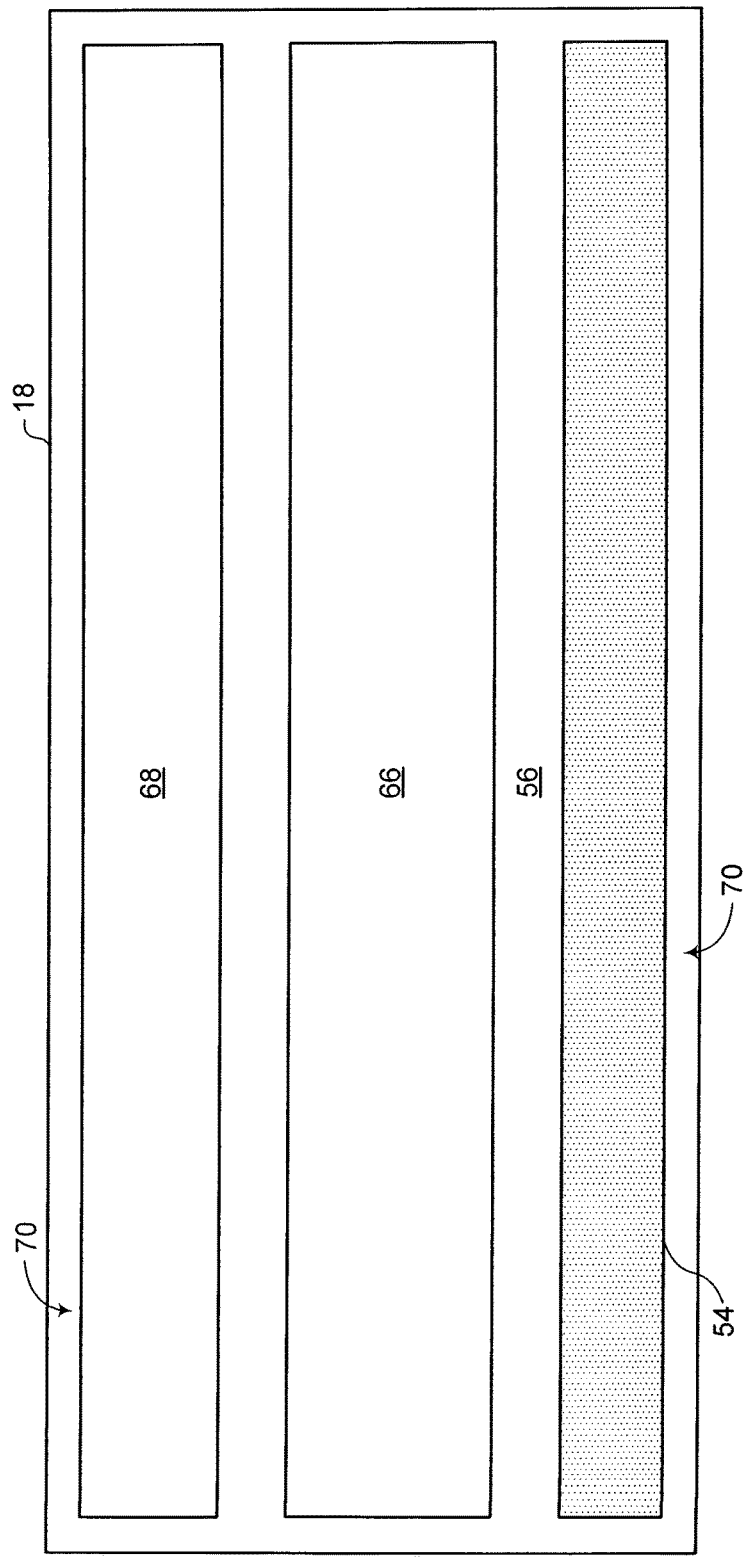

Reference is made to FIG. 4, which illustrates another example of a mandrel 18. The mandrel 18 of FIG. 4 is similar to the mandrel 18 of FIGS. 2 and 3, except as follows. The reinforcement zone 66 is relatively long to facilitate fabrication of the reinforcement 14. In addition, the resin zone 68 abutting the reinforcement zone 66 includes a similar length to facilitate infusion of the resin 16 into the reinforcement 14. Furthermore, the exit breather 54 optionally includes a length similar to the reinforcement zone 66 to facilitate a relatively even draw of air and/or gasses from the envelope 20 and, thus, a relatively even flow of the resin 16 across and into the reinforcement 14.

Figure 5:
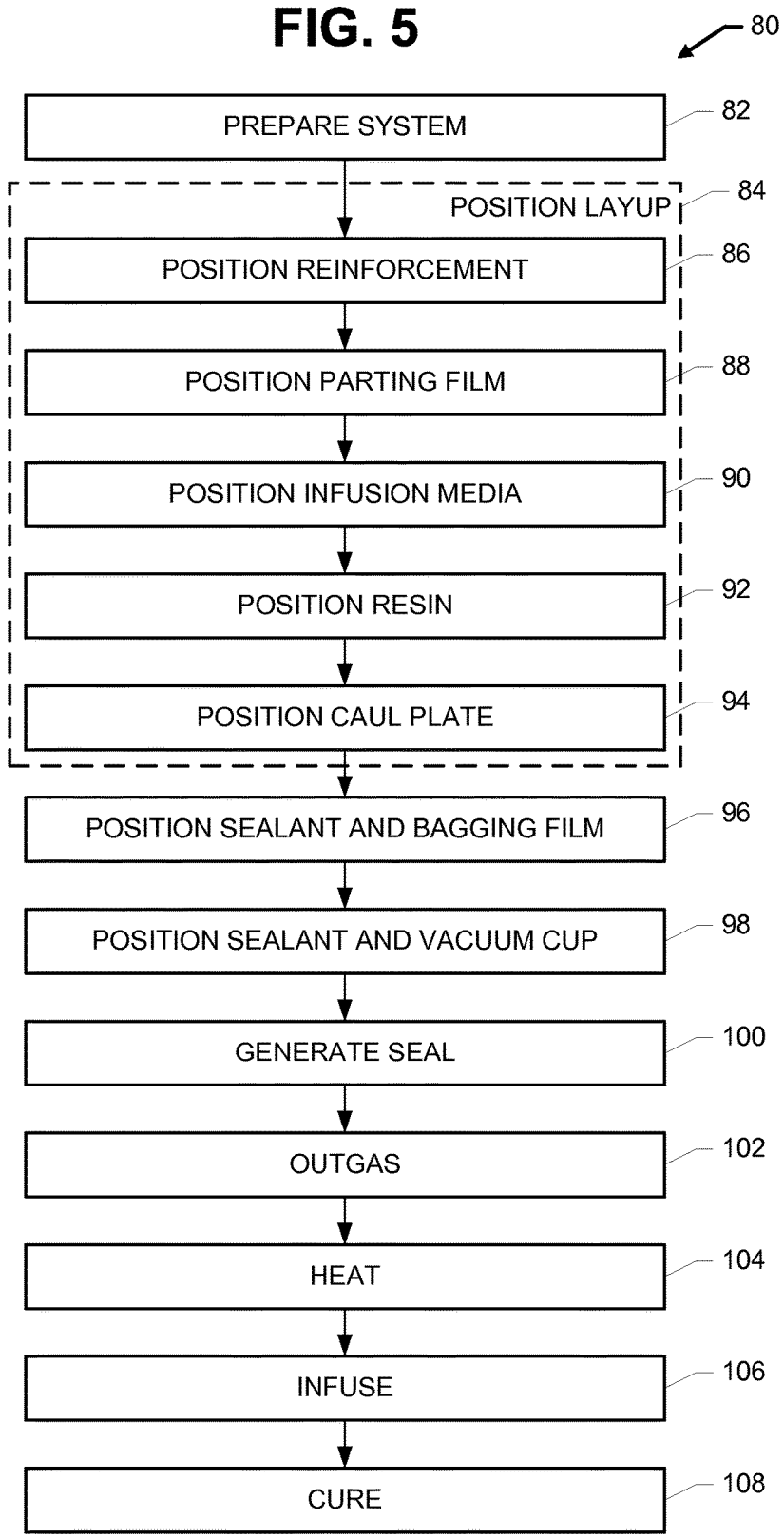
FIG. 5 is an illustration of a method of performing bulk resin infusion.

FIG. 5 illustrates a method 80 of performing bulk resin infusion. At step 82, the BRI system 10 is prepared. For example, the mandrel 18 may be prepared for resin infusion by applying a release coating to any surfaces that may come into contact with the resin 16. In addition, vacuum lines may be attached to the vacuum port 50 and vacuum generator 24.

The layup is positioned (indicating generally at 84). At step 86, the reinforcement 14 is positioned. For example, one or more plies or layers of reinforcing fibers are placed on the reinforcement zone 66. The fibers may include glass, carbon, Kevlar®, polymers, aramid, and/or other fibers.

At step 88, the parting films 40A and/or 40B are positioned. For example, the parting film 40A is disposed upon the reinforcement 14 and the parting film 40 B is disposed upon at a least a portion of the exit breather 54.

At step 90, the infusion media 42 is positioned. For example, two or more plies may be positioned so as to cover some portion of the reinforcement 14. In a particular example, the dead zone 58 is generated by leaving a relatively narrow portion of the reinforcement 14 uncovered by the infusion media 42. This enables resin 16 flowing across the infusion media 42 to be directed into the reinforcement 14. The infusion media 42 may further be disposed upon some portion or abutting the resin zone 68 to enable the resin 16 to flow from the resin zone 68, across the reinforcement 14, and towards the exit breather 54.

At step 92, the resin 16 is positioned at the resin zone 68. By placing the resin 16 adjacent to the reinforcement 14, rather than below, above, and/or within the reinforcement 14, melting the resin 16 does not result in a re-arrangement and/or wrinkling of the reinforcement 14.

At step 94, the caul plate 44 may be utilized to reduce surface irregularities. If utilized, the caul plate 44 is disposed relatively above the reinforcement 14.

At step 96, after the layup has been positioned, the sealant 48 and bagging film are positioned. The sealant 48 is disposed upon the sealant zone 70. For example, a sticky, tacky, or adhesive ribbon or cord-like material may be disposed about a perimeter of the mandrel 18. The bagging film 46 is positioned. For example, the bagging film 46 may be disposed to extend to or beyond the sealant 48.

At step 98, the sealant 60 and the vacuum cup 22 are positioned. The sealant 60 may be disposed upon the bagging film 46 about the perimeter of the resin 16. For example, a sticky, tacky, or adhesive ribbon or cord-like material may be disposed about a perimeter of the resin 16. The vacuum cup 22 may be disposed upon the sealant 60. In addition, vacuum lines connecting the vacuum cup 22 to the vacuum generator 26 may be installed.

At step 100, sufficient force is placed upon the bagging film 46 to form a seal between the bagging film 46 and the sealant 48 and/or between the sealant 48 and the sealant zone 54 of the mandrel 18. In addition, the vacuum cup 22 may be similarly pressed upon the sealant 60 to generate a seal between the vacuum cup 22 and the sealant 60 and/or between the sealant 60 and the bagging film 46. A leak check may be performed at this time.

At step 102, an out gassing procedure may be performed. For example, the vacuum generators 24 and 26 may create a lower (than ambient) pressure in the chamber 62 to hold the bagging film 46 above the resin 16, creating a volume through which gasses may escape prior to infusion. In a particular example, such as with the use of thermoset resins, the heater 34 may apply sufficient heat to the resin 16 to reduce the viscosity of the resin 16. Bubbling activity begins. The out gassing may be considered completed when the bubbling activity stops. The vacuum cup 22 may be made of a transparent material to facilitate viewing the resin 16.

In some embodiments, the outgassing is not performed. For instance, the resin 16 may already be sufficiently degassed.

At step 104, heat is applied and, at step 106, the resin is infused. A pressure differential is created between the outside of the bagging film 46 over the resin zone 68 to control rate and pressure at which the resin 16 is infused into the reinforcement 14. In a particular example, the valve 28 may be modulated to stop or reduce the flow of inert gas from the chamber 62 to the vacuum generator 26 and the valve 30 may be modulated to allow a controlled amount of inert gas into the chamber 62.

The resin pressure and infusion rate are controlled independently of the compaction pressure on the reinforcement 14. This is highly advantageous because it prevents uncontrolled infusion that may flood the reinforcement 14 with resin 16 and thereby cause some shifting of the various layers of the reinforcement 14.

Another advantage is that excess resin is less of a concern. Once the reinforcement 14 is filled, any leftover resin stays under the vacuum cup 22. Thus, precise calculation of the initial resin weight is no longer needed to avoid excess resin in the reinforcement 14.

At step 108, the resin-infused reinforcement 14 is cured. In some embodiments, the BRI device 12 may be placed in a pressure vessel such as an autoclave. During curing, the autoclave increases ambient pressure and heats the resin 16. During infusion, the vacuum cup 22 may be at a pressure higher than standard atmospheric pressure. The pressure differential may be actively or passively controlled during the pressurization phase of the autoclave run.

The pressure differential may be passively controlled so that vacuum cup pressure automatically maintains a fixed pressure difference below ambient pressure in the autoclave. For instance, the passive control may be accomplished by a regulator or check valve that actuates at a set pressure differential (e.g., 5 psi) so that the vacuum cup pressure automatically remains 5 psi below the ambient pressure in the autoclave throughout the pressurization cycle.

After curing, the layup is removed from the BRI device 12, and the cured reinforcement is parted from the layup. The cured reinforcement may be finished, for example, by sanding, polishing, milling, cleaning, or the like.

The invention claimed is:

1. A method for performing resin infusion into a dry reinforcement on a layup mandrel, the method comprising:
   placing resin at a resin zone on the layup mandrel;
   bagging the reinforcement and the resin with a bagging film;
   heating the resin while applying compaction pressure to the bagging film to cause the resin to be infused into the reinforcement; and
   creating a pressure differential outside of the bagging film over the resin zone to control rate and pressure at which the resin is infused into the reinforcement;
   whereby the resin pressure and infusion rate are controlled independently of the compaction pressure on the reinforcement.

2. The method of claim 1, wherein the rate of the infusion is controlled by modulating the pressure differential.

3. The method of claim 1, wherein a vacuum cup is used to create the pressure differential over the resin zone.

4. The method of claim 3, further comprising sealing the vacuum cup to an outside of the bagging film over the resin zone.

5. The method of claim 3, wherein the vacuum cup includes a chamber that is placed over the resin zone, and wherein pressure within the chamber is modulated during the resin infusion.

6. The method of claim 5, wherein pressure in the chamber exceeds pressure within the bagging film during resin infusion.

7. The method of claim 5, wherein an autoclave is used to heat the resin and increase ambient pressure on the bagging film; and wherein the chamber pressure is higher than standard atmospheric pressure during resin infusion.

8. The method of claim 7, wherein the pressure differential is passively controlled so that vacuum cup pressure automatically maintains a fixed pressure differential to the ambient pressure outside the bagging film.

9. The method of claim 3, wherein infusion media is used to transport resin from the resin zone to the reinforcement; and wherein a scalloped area of the vacuum cup is used to concentrate force on adjacent areas of the infusion media as the resin flows from the resin zone to the infusion media.

10. The method of claim 1, further comprising placing infusion media above the resin so the bagging film pushes the infusion media down into the resin to begin the resin infusion.

11. The method of claim 1, wherein the resin is disposed in contact with infusion media, which is adjacent to the reinforcement.

12. The method of claim 1, wherein the resin is solid or putty-like.

13. A method comprising performing bulk resin infusion of resin into a reinforcement starting with resin at a starting location underneath an envelope, wherein ambient pressure around a portion of the envelope that covers the resin is modulated relative to ambient pressure around a portion of the envelope that covers the reinforcement to control resin pressure and infusion rate independently of compaction pressure on the reinforcement, wherein out gassing of the resin is performed prior to resin infusion, and wherein the out gassing includes applying a lower-than-ambient pressure outside of the envelope over the resin starting location to lift the envelope off the resin and thereby create a volume through which gasses may escape prior to infusion.

14. The method of claim 13, wherein a vacuum cup including a chamber is placed on the envelope over the resin starting location, and wherein pressure within the chamber is controlled relative to the pressure within the envelope to facilitate the resin infusion.

15. The method of claim 13, wherein an autoclave is used to heat the resin and increase ambient pressure on the envelope; and wherein a chamber pressure is higher than standard atmospheric pressure during resin infusion.

16. The method of claim 13, wherein infusion media is placed above the resin prior to the resin infusion so the envelope pushes the infusion media down into the resin to begin the resin infusion.

17. A method for performing resin infusion into a dry reinforcement on a layup mandrel, the method comprising:
   placing resin at a resin zone on the layup mandrel;
   bagging the reinforcement and the resin with a bagging film;
   heating the resin while applying compaction pressure to the bagging film to cause the resin to be infused into the reinforcement; and
   creating a pressure differential outside of the bagging film over the resin zone to control rate and pressure at which the resin is infused into the reinforcement;
   whereby the resin pressure and infusion rate are controlled independently of the compaction pressure on the reinforcement;
   wherein out gassing of the resin is performed prior to resin infusion, the out gassing includes applying a lower-than-ambient pressure outside of the bagging film over the resin zone to lift the bagging film off the resin and thereby create a volume through which gasses can escape prior to infusion.

18. The method of claim 17, wherein the rate of the infusion is controlled by modulating the pressure differential.

19. The method of claim 17, wherein a vacuum cup is used to create the pressure differential over the resin zone.

20. The method of claim 19, further comprising sealing the vacuum cup to an outside of the bagging film over the resin zone.

* * * * *